(12) United States Patent
Suomi (10) Patent No.: US 6,628,089 B2
(45) Date of Patent: Sep. 30, 2003

(54) EXTRACTION OF ACCESSORY POWER FROM A SIGNAL SUPPLIED TO A LUMINAIRE FROM A PHASE ANGLE DIMMER

(75) Inventor: Eric W. Suomi, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 10/061,689

(22) Filed: Feb. 1, 2002

(65) Prior Publication Data

US 2003/0146715 A1 Aug. 7, 2003

(51) Int. Cl.[7] .......................... H05B 37/02; H05B 41/29
(52) U.S. Cl. .................................. 315/194; 315/DIG. 4
(58) Field of Search ............................. 315/194, 209 R, 315/307, 291, 292, 294, 199, 112, 113–118, 312, 314, 319, 324, 224, 219

(56) References Cited

U.S. PATENT DOCUMENTS

| | | | | |
|---|---|---|---|---|
| 4,728,866 A | * | 3/1988 | Capewell et al. | 315/224 |
| 4,797,599 A | * | 1/1989 | Ference et al. | 315/194 |
| 5,004,957 A | | 4/1991 | Cunningham | 315/199 |
| 5,691,605 A | * | 11/1997 | Xia et al. | 315/307 |
| 6,175,195 B1 | * | 1/2001 | Janczak et al. | 315/194 |
| 6,218,787 B1 | * | 4/2001 | Murcko et al. | 315/194 |
| 6,300,725 B1 | * | 10/2001 | Zinkler et al. | 315/291 |

OTHER PUBLICATIONS

Power Integrations, Inc.; TOP200–4/14 TOPSwitch Family; Three–terminal Off–line PWM Switch, Date Unknown, prior to current invention.
Premier Magnetics, Inc.; Off–Line Switch Mode Transformers; Date Unknown, prior to current invention.

\* cited by examiner

*Primary Examiner*—Don Wong
*Assistant Examiner*—Chuc Tran
(74) *Attorney, Agent, or Firm*—Greer, Burns & Crain, Ltd.; Philip M. Kolehmainen (57) ABSTRACT

Power for one or more luminaire accessories is extracted from a series of lamp operating pulses provided by a phase angle dimmer. A DC power supply is connected to the output of the dimmer to develop and store DC accessory power. A lamp controller is connected to the output of the dimmer to transfer power from the lamp operating pulses to the lamp. The lamp controller has a variable pulse transfer characteristic for providing lamp power without lamp performance degradation caused by accessory power variations. The variable pulse transfer characteristic can be implemented by a switching device that interrupts or blocks selected portions of the lamp operating pulses. The pulse transfer characteristic maintains constant apparent lamp brilliance independent of variations in accessory power requirements. In an off or in a preheat condition, power transfer to the lamp is reduced to prevent emission of a visible light beam. In a full brilliance condition, the lamp operating pulses are essentially unmodified by the lamp controller.

22 Claims, 5 Drawing Sheets

EXTRACTION OF ACCESSORY POWER FROM A SIGNAL SUPPLIED TO A LUMINAIRE FROM A PHASE ANGLE DIMMER

FIELD OF THE INVENTION

The present invention relates to providing power for accessories of a luminaire, and more particularly to extracting DC power from a lamp power signal supplied from a phase angle dimmer.

DESCRIPTION OF THE PRIOR ART

Luminaires for theatrical and architectural applications are provided with power by phase angle dimmers so that the lamps of the luminaires can be dimmed, or operated at variable, selected light levels. Phase angle dimmers for this purpose are well known, and typically include solid state switches such as SCRs for interconnecting an AC power source to a lamp load. AC voltage from the source is sinusoidal. A phase control circuit renders a solid state switch conductive at a point during a half cycle of the sinusoid, the point being selected to supply to the lamp a lamp operating pulse having a desired quantity of power in order to produce a desired level of light.

Although a luminaire can have a dedicated, internal dimmer, the typical approach in multiple luminaire applications is to provide centralized dimmers providing power through cabling extending to the distributed luminaires. Centralized dimmers are generally preferred because multiple luminaires can be supplied form a single dimmer, because centralized dimmers can be commonly controlled and because of efficient power distribution.

Systems including luminaires and phase angle dimmers are in widespread use and have been successfully employed for controlling variable light levels in many applications. There is an increasing desire to supplement dimming effects provided by luminaires with other variable parameters provided by accessories and automation. For example, it may be desirable to add mechanized devices such as color scrollers or color wheels or gobo wheels or the like to a dimmer powered luminaire. It may be desirable to provide a luminaire that can be moved by motors incorporated into the mount of the luminaire so that the beam of light from the luminaire can be aimed with pan and tilt motions. A luminaire may be provided with other accessory mechanisms such as a zoom lens, an iris or a shutter system.

Such accessories require power to operate. The motors used for automation and accessories are typically energized by low voltage DC power. The power supplied by dimmers for lamp energization is in the form of a series of lamp operating pulses having a frequency dependent on the AC line frequency. The pulses may be at, or at a multiple of, the line frequency depending on the dimmer system. The motors typically used for accessories cannot be powered directly from the dimmed power supplied for the lamp of a luminaire. Consequently, in known centralized dimmer systems, additional power cables are used to supply DC power for operation of accessories. A luminaire in this type of system is connected to one cable system providing lamp power from a dimmer and another independent cable system providing accessory power. This is an expensive and complex arrangement, particularly in view of the fact that a large number of luminaires may be used in any particular installation.

Another disadvantage of the need for independent accessory power supply wiring is encountered when retrofitting existing dimmer controlled systems where luminaires and light power cabling have been previously installed. If it is desired to add powered accessories to a previously installed system, it can be expensive and difficult to add a new, additional cable system for powering accessories.

To overcome the problems resulting from the need for separate cabling systems for lamp power and accessory power, it would be desirable to extract accessory power from the lamp power provided to the luminaire by a phase angle dimmer.

One potential difficulty with an accessory power extraction approach is that accessories used with luminaires have variable power requirements. For example, a motor for moving a luminaire to aim a light beam could draw little or no power when the luminaire is stationary but would draw an increased amount of power when the luminaire is moving. Similarly, with other types of powered luminaire accessories, the requirement for power can vary over time. If accessory power in varying amounts is extracted from the power supplied by a dimmer for lamp enerigation, the brilliance of the light emitted by the lamp of the luminaire could also vary. Light level variations due to powering of accessories are distracting, unattractive and undesirable.

Another potential difficulty is that the accessory power extracted from the lamp power from the dimmer must be sufficient to operate the accessory even when the lamp is off. But if the accessory and the lamp are supplied simultaneously, the power level needed for operation of the accessory could be so large that the lamp is powered to a visible state. This is undesirable because the lamp must be capable of being placed in an off state, or a filament preheat state, and even during this state, accessory power must remain available.

Another requirement is that the lamp should be capable of being powered to full brilliance. If accessory power is extracted from lamp power, this should be accomplished in such a way as not to decrease power in the full on state.

SUMMARY OF THE INVENTION

A primary object of the present invention is to extract accessory power from the lamp power provided by a phase angle dimmer for powering luminaire accessories without the need for additional DC power cables and without degrading lamp performance. Other objects are to provide a method and system for extracting accessory power over a range of accessory power loads while preserving the ability to operate a lamp at selected light levels from an off condition to a full power level; to provide a method and system for extracting accessory power that permits the lamp to operate in an off or preheat state; and to provide a method and system for extracting accessory power that permits the lamp to operate at full brilliance.

In brief, in accordance with the invention there is provided a power supply system for a luminaire having a lamp and having a powered accessory with varying power requirements. The power supply system includes a phase control dimmer with a solid state switch providing lamp operating pulses and having an output. An accessory power supply is connected between the dimmer output and the powered accessory. A lamp supply circuit branch is connected between the dimmer output and the lamp for transferring power from the lamp operating pulses to the lamp.

In brief, in accordance with the invention, there is provided a method for extracting power for luminaire accessory operation from lamp operating pulses supplied to a luminaire by a phase angle dimmer. The method includes supplying the output pulses from the phase angle dimmer to the input of an accessory power supply circuit. The output from the accessory power supply circuit is applied to a luminaire accessory having variable power requirements. The output pulses from the phase angle dimmer are delivered to the input of a lamp controller. The output from the lamp controller is furnished to a lamp of the luminaire. The transfer of the output pulses from the phase angle dimmer control to the lamp is regulated by operation of the lamp controller.

BRIEF DESCRIPTION OF THE DRAWING

The present invention together with the above and other objects and advantages may best be understood from the following detailed description of the preferred embodiments of the invention illustrate in the drawings, wherein.

DETAILED DESCRIPTION OF THE PREFERRED EMBODIMENTS

Figures 1, 2:
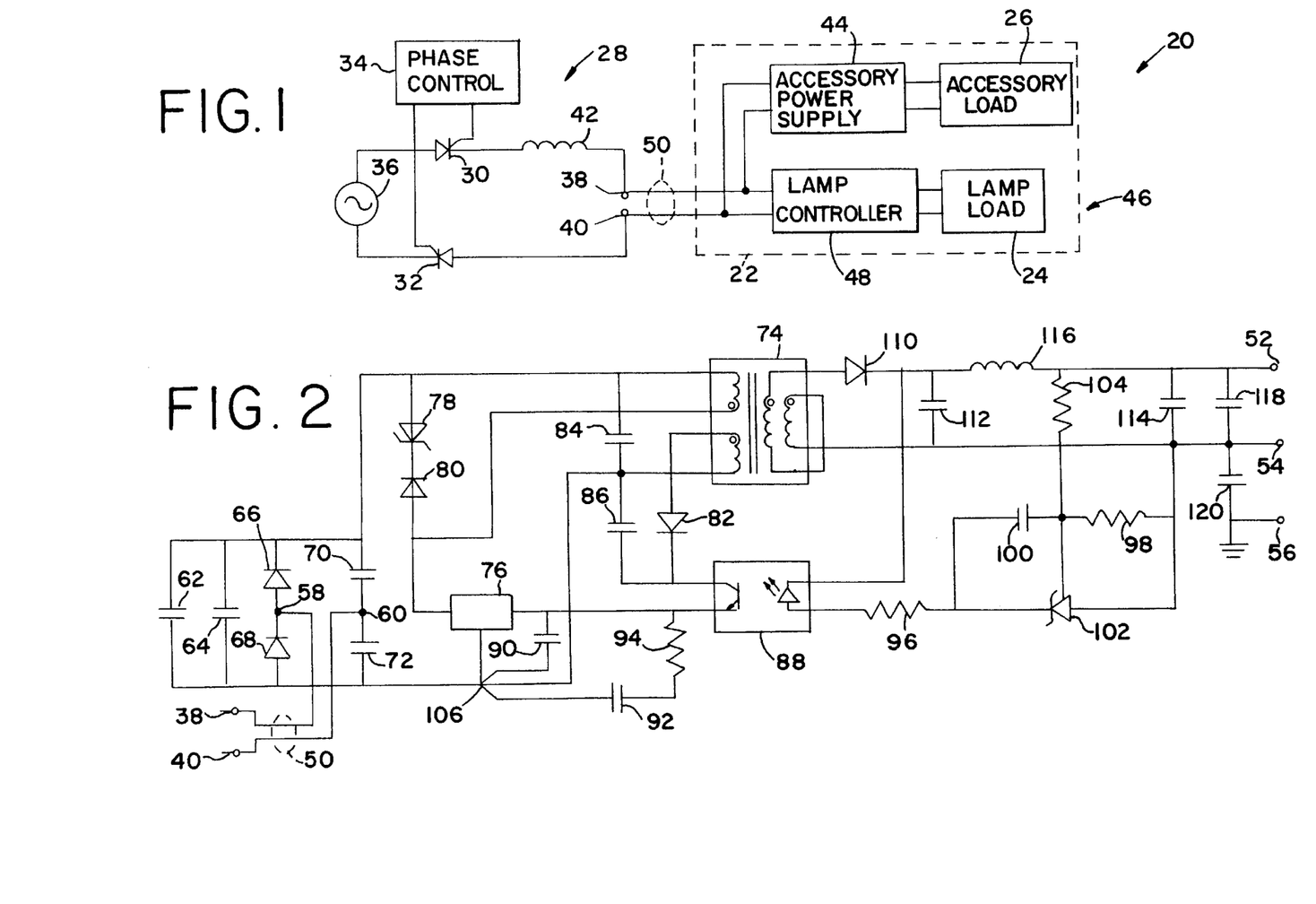
FIG. 1 is a schematic block diagram of a luminaire power supply system for a luminaire constructed in accordance with the present invention.
FIG. 2; is a schematic diagram of the accessory power supply of the power supply system of FIG. 1.

Having reference now to the drawing and initially to FIG. 1, there is shown in schematic, block diagram form a power supply system generally designated as 20 and constructed in accordance with the principles of the present invention. The power supply system 20 supplies lamp power and accessory power to a luminaire 22. The luminaire 22 has one or more lamps resulting in a lamp load 24. Typically the luminaire has an incandescent lamp with one or more resistive filaments. The luminaire 22 also has one or more powered accessories resulting in an accessory load 26. The accessory load may result from any accessories such as pan or tilt motors, motor driven color scrollers or color wheels or gobo wheels, or a powered zoom lens, iris and/or shutter system, or others. The accessory load is variable depending on accessory power demands over time.

The power supply system 20 includes a phase angle dimmer generally designated as 28. Dimmer 28 may be generally of a conventional type including a pair of solid state switches 30 and 32. As seen in FIG. 1, the switches 30 and 32 may be SCRs. A phase control 34 renders the SCRs 30 and 32 conductive at a selected point in each half cycle of an AC input power signal supplied from a standard AC power source 36. The SCRs become nonconductive at the end of each half cycle. The point of conduction is selected to supply to the lamp load 24 an amount of power corresponding to a desired lamp brilliance.

As a result of the switching action of the SCRs 30 and 32, the dimmer 28 applies to a pair of dimmer output terminals 38 and 40 a series of lamp operating pulses. The frequency of the lamp operating pulses is determined by the frequency of the AC power source 36. In the conventional dimmer of FIG. 1, pulses of alternating polarity are supplied at double the line source frequency. In other known arrangements, alternate pulses may be supplied by multiplexing to a plurality of lamps at line frequency or at another frequency related to the line frequency. The duration of the pulses, as determined by the conduction point set by the phase control 34, establishes the amount of dimming and thus the brilliance of the lamp load 24. An inductor 42 is typically included in the path of the lamp operating pulses to attenuate abrupt current flow changes and limit resulting vibration and noise of lamp filaments.

In accordance with a feature of the invention, power for the accessory load 26 is extracted from the lamp operating pulses provided by the dimmer 28. The power supply system 20 includes an accessory power supply 44 connected between the dimmer 28 and the accessory load 26. The accessory power supply 44 extracts accessory power from the dimmer output and provides it to the accessory load 26. The power supply system 20 also includes a lamp supply circuit branch 46 connected between the dimmer 28 and the lamp load 24 for supplying lamp power from the dimmer 28 to the lamp load 24. As a result, both the lamp load 24 and the accessory load 26 are powered from the dimmer 28. Because the accessory load is powered from the dimmer 28, only a single cable 50 is needed to provide power to both the lamp and accessory loads 24 and 26.

In accordance with another feature of the invention, the lamp supply circuit branch includes a lamp controller 48 that selectively transforms the lamp operating pulses from the dimmer 28 and transfers power to the lamp load 24. The lamp controller 48 has a variable pulse transfer characteristic. The variable pulse transfer characteristic permits the lamp controller 48 to maintain a constant apparent lamp brilliance independent of variations in the power requirement of the accessory load, to permit the lamp load to operate at full brilliance, and to permit powering of accessories in a lamp off or preheat condition.

In order to realize all the advantages of the present invention, the accessory power supply 44 and the lamp controller 48 are preferably located in or near the luminaire 22 and are connected to the dimmer output terminals 38 and 40 by the cable 50. As illustrated in FIG. 1, the accessory power supply 44 and the lamp controller 48 are incorporated into the luminaire 22.

The accessory power supply 44 is illustrated in FIG. 2. In the illustrated arrangement the power supply 44 is a wide input range switch mode DC power supply providing positive and negative DC power at output terminals 52 and 54 respectively floating relative to a chassis/earth ground terminal 56. This power supply is one example of a flyback buck converter, and other implementations could be employed. Power supply 44 is used with DC motor powered luminaire accessories. Other types of accessory loads and power supplies are possible within the scope of the present invention.

The lamp operating pulses from dimmer output terminals 38 and 40 are supplied via cable 50 and are received at power supply input terminals 58 and 60. Capacitors 62 and 64 provide ripple filtering for isolating conducted noise from the AC input. Diodes 66 and 68 together with capacitors 70 and 72 are a voltage doubler providing high voltage DC for the power supply 44.

A transformer 74 switches at a high frequency such as one hundred kilohertz under the control of a solid state switching module 76 such as a "TOPSwitch" brand TOP204 module sold by Power Integrations, Inc. A pair of clamping diodes 78 and 80 connected across the primary switching input of transformer 74 are connected to the drain terminal of the switching module 76 and isolate the switching module 76 from transformer inductive kick. A diode 82 is a rectifier for the bias winding of the transformer 74. Capacitors 84 and 86 are bypass capacitors.

Feedback operation is enabled by an optocoupler 88 having its output connected to the control terminal of the switching module 76. Capacitor 90 provides high frequency bypass. Capacitor 92 and resistor 94 provide frequency compensation for feedback stabilization. Capacitor 90 and the circuit branch including capacitor 92 and resistor 94 are connected to a Kelvin connection 106, as is the source terminal of the switching module 76. A network including resistors 96 and 98, capacitor 100 and diode 102 establishes a voltage reference for energization of the optocoupler 82. Resistors 104 and 98 are a voltage divider input for the voltage reference network.

The output from transformer 74 is coupled through a diode 110 to a low pass pi filter including capacitors 112 and 114 and inductor 116. Capacitors 118 and 120 smooth high frequencies. DC voltage is stored in capacitors 112 and 114 for continuous DC power during and between lamp operating pulses supplied by the dimmer 28. The power supplied by the accessory power supply 44 varies depending on the varying power requirements of the accessory load 26. This varying power is extracted directly and continuously from the repetitive lamp operating pulses.

Figure 3:
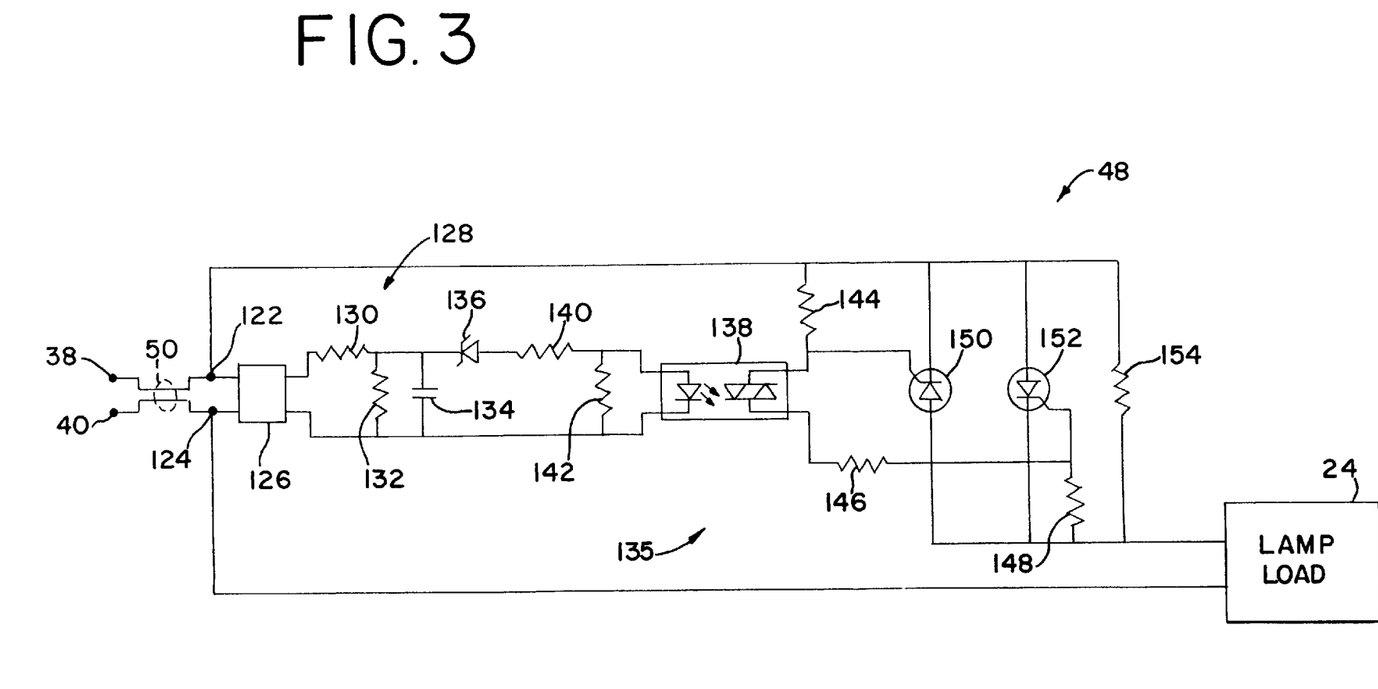
FIG. 3 is a schematic diagram of the lamp controller of the power supply system of FIG. 1.

The lamp controller 48 is illustrated in FIG. 3. Lamp operating pulses are received at input terminals 122 and 124 from dimmer output terminals 38 and 40 via cable 50. A rectifier bridge 126 rectifies lamp operating pulses so that pulses of uniform polarity are integrated in the same manner by an integrator circuit 128 including resistors 130 and 132 and a capacitor 134. The integrated signal is stored in capacitor 134. When the stored integrated signal reaches a threshold value, a switching circuit 135 is triggered to transfer pulses to the lamp load 24. When the threshold value is reached, a zener diode 136 is rendered conductive to turn on a normally open optotriac 138 through a voltage divider including resistors 140 and 142.

When the optotriac 138 conducts, trigger circuits including resistors 144, 146 and 148 render an opposed pair of SCRs 150 and 152 conductive to couple selected and regulated portions of lamp operating pulses from the dimmer output terminals 38 and 40 to the lamp load 24. The SCRs 150 and 152 are of opposite polarity and function as a bidirectional solid state switching device. A shunt ballast resistor 154 presents a resistive load to the dimmer 28 across the input terminals 122 and 124 of the lamp controller 48 when the SCRs 150 and 152 are nonconductive. The shunt resistor 154 is bypassed by the SCRs 150 and 152 when they are conductive.

The integrator 128 and switching circuit 135 function to provide a variable pulse transfer characteristic. Rather than simply transferring lamp operating pulses from the dimmer 28 to the lamp load 24, the lamp controller 48 instead varies the portions of the pulses that are transferred, thereby to permit extraction of accessory power without degrading lamp performance. The effect of this operation can be seen in the waveforms shown in FIGS. 4A and B, 5A and B, 6A and B and 7A and B. These depictions are somewhat idealized in that high frequencies are removed better to show the basic waveforms existing at the common input to the lamp controller 48 and accessory power supply 44. In these figures, the horizontal X axis represents time and the vertical Y axis represents voltage.

Figure 4A:
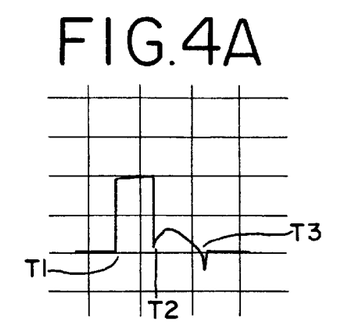
FIGS. 4A and 4B are waveforms showing the voltage at the output of the phase angle dimmer and at the input of the lamp controller in a lamp preheat condition and at low and high accessory load conditions respectively.
Figure 4B:
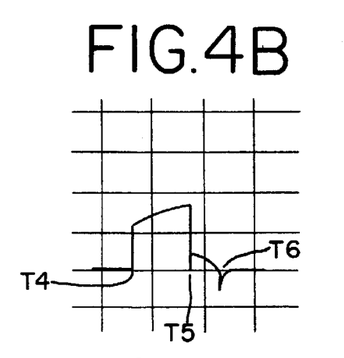

The power supply system 20 can be operated in an off or filament preheat mode, while continuing to supply sufficient power for luminaire accessories. This mode is illustrated in FIGS. 4A and 4B. FIG. 4A illustrates the voltage waveform over time of a lamp operating pulse seen at the output of the dimmer 28 and at the input of the lamp controller 48. This pulse is one of a series of pulses supplied from dimmer 28. In the illustrated arrangement, the lamp operating pulses are supplied at double the AC line frequency and are of alternating opposite polarities, however other pulse train configurations may be employed.

FIG. 4A shows the operation when the lamp load is in a preheat condition and the load requirement of the accessory load 26 is at a low value. During the first portion of the lamp operating pulse, from time T1 to time T2, the accessory power supply is extracting a relatively small amount of accessory power, sufficient to develop and maintain a stored DC voltage in preparation for increased accessory power demand. During this time period, the switching circuit 135 of the lamp controller 48 is nonconductive, or open, while the magnitude of the integrated signal stored at capacitors 112 and 114 in the lamp controller 48 is maintained or increasing.

At time T2, the threshold trigger value is reached in the integrator 128 and the switching circuit 135 is rendered conductive, or closed. The drop in impedance causes a drop in the waveform voltage at time T2. For the remainder of the pulse, until time T3, the accessory power supply 44 continues to operate while the switching circuit 135 remains closed and power is supplied to the lamp load 24. This amount of power is sufficient to maintain the lamp filament in a preheated state and is insufficient for the lamp to emit a visible light beam. At the end of the lamp operating pulse at time T3, the lamp controller 48 returns to its initial condition. The pulse transfer characteristic of the lamp controller 48 in this mode of operation is such that only a small part of the entire pulse is transferred to the lamp load.

FIG. 4B illustrates the operation with the lamp in a preheat state and with an increased accessory power requirement. Between the beginning of the pulse at time T4 and time T5, the trigger value is not reached in the integrator 128, the switching circuit 135 is open, and the accessory power supply circuit 44 is extracting accessory power. At time T5 the trigger value is reached at the integrator 128, and the switching circuit 135 closes. The voltage value of the waveform drops at time T5 due to the decrease in impedance. During the remaining portion of the pulse, from time T5 to time T6 in FIG. 4B, the accessory power supply 44 continues to extract accessory power while lamp power is also supplied through the lamp controller 48 to the lamp load 24.

Inductor 42 in the dimmer 28 resists changes in the rate of current flow and has a larger effect at higher current flow rates. Because of this effect, the time required to for the integrator 128 to trigger the switching circuit 135 is greater for high accessory load demand (FIG. 4B) than at lower accessory load demand (FIG. 4A). However, as with the low accessory power requirement operation in FIG. 4A, the pulse transfer characteristic is such that the amount of power supplied to the lamp load is sufficient only to maintain the lamp filament in a preheated state and is insufficient for the lamp to emit a visible light beam.

If desired, the operating characteristic of the integrator 128 and the duration of the pulses supplied by the dimmer 28 could be configured to provide a full off lamp load condition. In this case, rather than turning on the switching circuit 135 at a delayed point during the pulse at time T2, the switching circuit could be held open throughout the pulse. The preheat mode is preferred to the full off mode in order to maintain a more consistent filament resistance and to avoid filament stress.

Figure 5A:
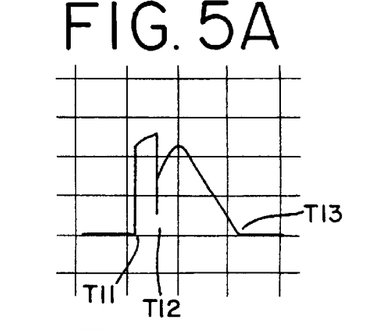
FIGS. 5A and 5B are waveforms showing the voltage at the output of the phase angle dimmer and at the input of the lamp controller in a moderate lamp brilliance condition and at low and high accessory load conditions respectively.
Figure 5B:
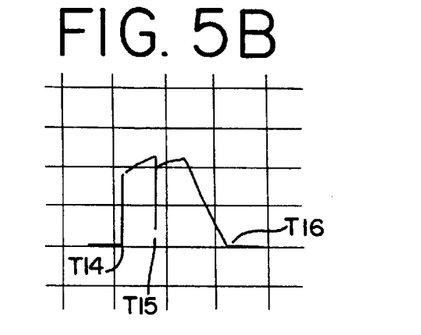

FIGS. 5A and 5B illustrate low and high accessory power loads respectively at a low or moderate light condition of the lamp load 24. The beginning of a lamp operating pulse occurs at time T11 in FIG. 5A, and from time T11 until time T12 the accessory power supply 44 is developing and storing DC power while the lamp controller 48 is initially blocking transfer of the operating pulse from the lamp load 24. At time T12, the threshold value is reached by integrator 128 and the switching circuit 135 closes. Power is then supplied to the lamp load 24 from time T12 until the lamp operating pulse ends at time T13. There is a brief drop in voltage at time T12 due to the impedance decrease. The pulse transfer characteristic is such that a selected portion of the entire lamp operating pulse is applied to lamp load 24 to maintain the desired moderate light brilliance level.

FIG. 5B illustrates the operation of the power supply system at a moderate light level with a high rather than a low accessory load requirement. From the beginning of the lamp operating pulse at time T14 until time T15, while the integrator 128 is charging and the switching circuit 135 is open, the accessory power supply 44 is operating and DC power is developed and stored. At time T15 the integrator 128 triggers the switching circuit 135 and power is supplied to the lamp load 24 from time T15 until the lamp operating pulse ends at time T16. There is a brief drop in voltage at time T15 due to the impedance decrease. Due to the effect of the inductor 42, the time required for the integrator 128 to reach the threshold level is slightly smaller at a low accessory power level (FIG. 5A) than at a higher accessory power level (FIG. 5B). The pulse transfer characteristic is such that a selected portion of the entire lamp operating pulse is applied to lamp load 24 to maintain the same desired moderate light brilliance level. The accessory power supply 44 continues to operate throughout the pulse duration from time T11 to time T12.

The lamp controller 48 maintains a consistent apparent lamp brilliance independent of variations in accessory load requirements. As a result, intermittent operation of powered accessories does not degrade lamp performance. Comparing the transferred pulse segments in FIGS. 5A and 5B, the pulse shape in FIG. 5A between times T12 and T13 is peaked, rounded and somewhat sinusoidal. In contrast, in FIG. 5B, the pulse shape between times T15 and T16 is less peaked, and more square in shape in its initial portion. The two pulse segment shapes differ from one another primarily due to the effect of the inductor 42 responding to different current conditions. However, despite the shape differences, power supplied to the lamp load 24 is relatively consistent in low and high accessory power situations because the area under the curves, or the RMS values of the pulse segments, are generally the same. The power transferred is sufficiently equal in low and high accessory power conditions that any difference in brilliance is not detectable or visible to a viewer.

Figure 6A:
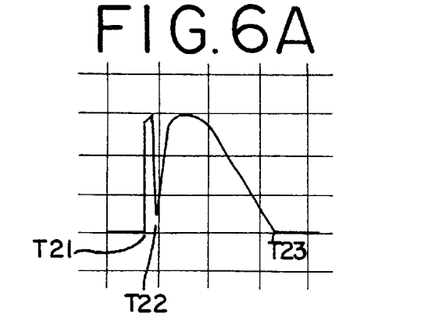
FIGS. 6A and 6B are waveforms showing the voltage at the output of the phase angle dimmer and at the input of the lamp controller in a full lamp brilliance condition and at low and high accessory load conditions respectively.

FIGS. 6A and 6B illustrate operation at a higher but not full lamp brilliance level and at low and high accessory power levels respectively. From the beginning of a lamp operating pulse at time T21 in FIG. 6A until time T22, the integrator 128 is charging, the switching circuit 135 is off, and the accessory power supply 44 is developing and storing DC power. At time T22 the integrator 128 triggers the switching circuit 135 and from time T22 until the end of the pulse at time T23, power is supplied to the lamp load 24.

Figure 6B:
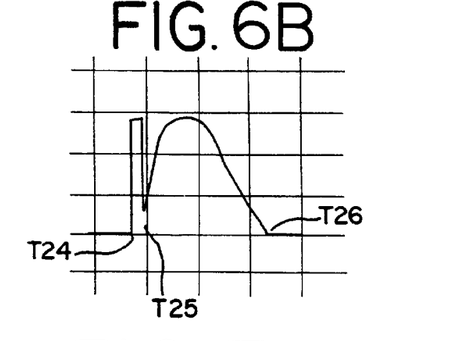

Similarly in FIG. 6B with an increased accessory load, from the beginning of a lamp operating pulse at time T24 until time T25, the integrator 128 is charging, the switching circuit 135 is off, and the accessory power supply 44 is developing and storing DC power. At time T25 the integrator 128 triggers the switching circuit 135 and from time T25 until the end of the pulse at time T26, power is supplied to the lamp load 24.

The waveforms in FIGS. 6A and 6B are quite similar to one another. The effect of the inductor 44 in the dimmer 28 is smaller than at the lower light levels of FIGS. 4A and 4B and of FIGS. 5A and 5B. In addition, the continuing average lamp operating pulse power level from the dimmer 28 is higher and the integrator 128 does not entirely discharge between pulses. This decreases the time at the beginning of each pulse required to charge the integrator and trigger the switching circuit 135. As a result, at both low and high accessory power levels the pulse transfer characteristic is such that the pulse transfer is delayed only slightly after the beginning of the pulse and nearly the entire pulse is transferred. There is no visible difference in lamp brilliance between low and high accessory power levels.

Figure 7A:
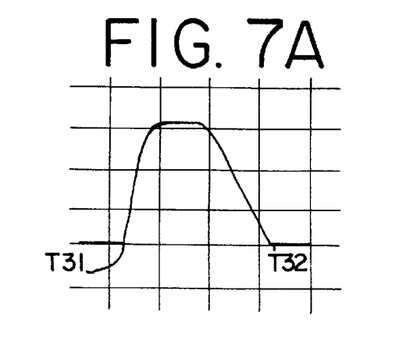
FIGS. 7A and 7B are waveforms showing the voltage at the output of the phase angle dimmer and at the input of the lamp controller in a full lamp brilliance condition and at low and high accessory load conditions respectively.
Figure 7B:
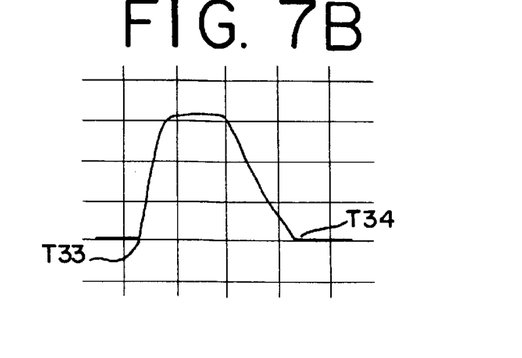

FIGS. 7A and 7B illustrate operation of the power supply system 20 at full lamp brilliance level and at low and high accessory power levels respectively. At the low accessory power level of FIG. 7A the pulse begins at time T31 and ends at time T32. At the high accessory power level of FIG. 7B the pulse begins at time T33 and ends at time T34. The waveforms if FIGS. 7A and 7B are substantially identical. Throughout the pulse in either case the accessory power supply 44 is developing and storing DC accessory power. The continuing average lamp operating pulse power level supplied from the dimmer 28 is relatively large and is sufficient to maintain the integrator 128 fully charged or substantially fully charged. As a result the entire or substantially the entire lamp operating pulse is passed through the lamp controller 48 to the lamp load 24. The pulse transfer characteristic at full lamp load is such as to transfer essentially the entire lamp operating pulse and not to diminish lamp brilliance. The extraction from the lamp operating pulses of accessory power by the accessory power supply 44 at any accessory power level has no discernable effect on apparent full lamp brilliance.

The varying pulse transfer characteristic of the lamp controller 28 appears from comparing the curves of FIGS. 4A, 4A, 6A and 7A and from comparing FIGS. 4B, 5B, 6B and 7B. Generally, the lamp controller receives the lamp operating pulses from the dimmer 28 and blocks variable, selected portions of the lamp operating pulses in order to reduce the amount of power supplied to the lamp load 24 by a varying amount. The reduction is largest at low lamp energization levels (FIGS. 4A and 4B) and the reduction decreases as the lamp energization level increases (FIGS. 5A, 5B, 6A and 6B). At high lamp energization levels, the reduction of the lamp operation pulses decreases substantially to zero and the lamp operating pulses are transferred to the lamp load 24 essentially in an undiminished state (FIGS. 7A and 7B).

The operation of and/or the control of the dimmer 28 is preferably tailored to compensate for the pulse transfer characteristic of the lamp controller 48. As compared with a conventional luminaire having no accessory load 26 and no accessory power supply 44, the dimmer 28 must supply larger lamp operating pulses at low and intermediate lamp energization levels to obtain the same lamp brilliance.

Figure 8:
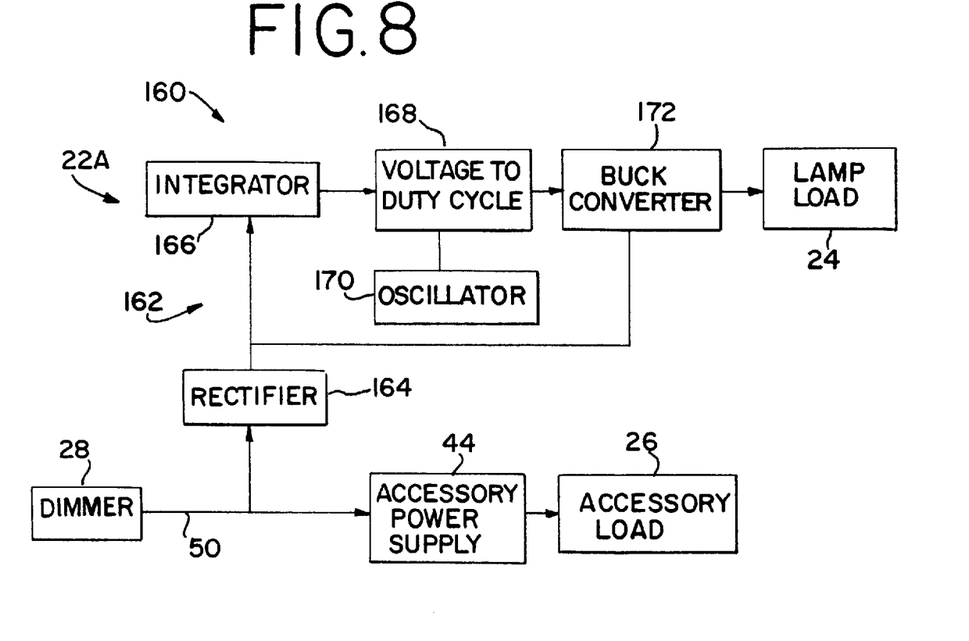
FIG. 8 is a schematic block diagram of another embodiment of a luminaire power supply system constructed in accordance with the present invention and using pulse width modulation.
Figure 9:
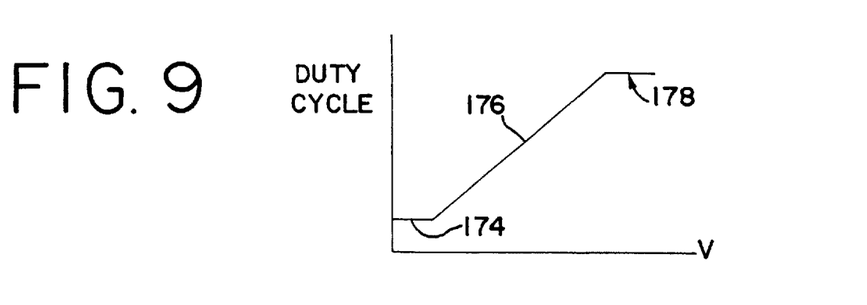
FIG. 9 is a graph illustrating the operating characteristic of the voltage-to-duty-cycle converter of the power supply system of FIG. 8.
Figure 10:
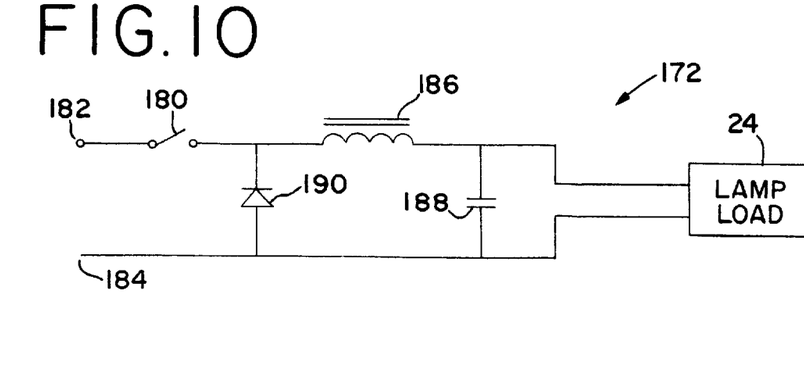
FIG. 10 is a simplified schematic diagram of a buck converter that can be used in the power supply systems of FIG. 8 or FIG. 11.

A power supply system 160, comprising another embodiment of the present invention, is illustrated in FIGS. 8–10 where elements common to the embodiment of FIGS. 1–7 are designated by the same reference characters. The dimmer 28 is connected to a luminaire 22A by the cable 50. The accessory load 26 is supplied with DC operating power by the accessory power supply 44. The power supply system 160 and the accessory power supply 44 may be incorporated into or located in proximity to the luminaire 22A.

The power supply system 160 uses pulse width modulation (PWM) techniques to transform lamp operating pulses from the dimmer 28 and transfer power to the lamp load 24 with a variable pulse transfer characteristic. A PWM lamp controller 162 receives lamp operating pulses of selected duration from the dimmer 28, selectively transforms the lamp operating pulses from the dimmer 28 and delivers power to the lamp load 24. The variable pulse transfer characteristic of the lamp controller 162 permits the lamp controller 162 to maintain a constant apparent lamp brilliance independent of variations in the power requirement of the accessory load 26, permits the lamp load to operate at full brilliance, and permits powering of accessories in a lamp off or preheat condition.

A rectifier 164 rectifies the alternate polarity lamp operating pulses from the dimmer 28 and applies uniform polarity pulses to an integrator 166. The integrator 166 develops a DC voltage proportional to the duration of the lamp operating pulses supplied by the dimmer 28. This DC voltage is applied as an input to a voltage-to-duty-cycle converter 168 provided with a constant high frequency drive signal by an oscillator 170. A buck converter 172 is connected between the voltage to duty cycle converter 168 and the lamp load 24. PWM pulses are output from the voltage to duty cycle converter 168 and the pulses have a duty cycle determined by the DC voltage supplied from the integrator 166. The PWM pulses operate the buck converter 172 effectively to variably and partially block portions of the lamp operating pulses supplied by the dimmer 28 and thereby to achieve a variable pulse transfer characteristic.

The operating characteristic of the voltage-to-duty-cycle converter 168 is shown graphically in FIG. 9. At low lamp energization levels, the rectifier 164 and integrator 166 provide a relatively low voltage V as indicated by the reference character 174 in FIG. 9. This condition corresponds to a lamp load preheat condition. The duty cycle of the voltage-to-duty-cycle converter 168 is at a relatively low value and PWM pulses of relatively short duration are supplied to control the buck converter 172.

As the duration of the lamp operating pulses from the dimmer 28 increases, an increasing voltage V is developed by the rectifier 164 and integrator 166. The increasing voltage is designated as 176 in FIG. 9. As the voltage V increases, the duty cycle of the voltage-to-duty-cycle converter 168 increases and PWM pulses of increasing duration are applied to control the operation of the buck converter 172. As full brilliance of the lamp load 24 is approached, the voltage V developed by the rectifier 164 and integrator 166 reaches a maximum 178. The duty cycle of the voltage-to-duty-cycle converter 168 also reaches a maximum.

FIG. 10 illustrates an example of a simplified buck converter 172. Buck converter 172 includes a switch 180 that is preferably a fast acting solid state switching device controlled by the PWM pulses applied by the voltage-to-duty-cycle converter 168. When a PWM pulse is present the switch 180 is closed and when no PWM pulse is present the switch 180 is open. As the duration of the PWM pulses supplied by the voltage-to-duty-cycle converter 168 increases, proportion of time that the switch 180 is closed also increases.

Rectified lamp operating pulses are supplied from the rectifier 164 to input terminals 182 and 184 of the buck converter 172. A filter circuit including an inductor 186 and a capacitor 188 provide a dc lamp operating voltage across the capacitor 188. A diode 190 permits continuing current flow caused by collapse of the magnetic field of inductor 186 after opening of the switching device 180.

In operation of the power supply system 160 of FIGS. 8–10, the voltage-to-duty-cycle converter 168 operates the buck converter 172 in order to selectively and variably block portions of the lamp operating pulses supplied by the dimmer 28. The variable blocking operation is performed by the switch 180 under the control of the voltage-to-duty-cycle converter 168 which is in turn controlled by the voltage supplied by the integrator 166 in accordance with the duration of the lamp operating pulses.

At low energization levels, for example in a lamp load preheat condition, the switch 180 is open for a relatively low proportion of time, relatively large portions of the lamp operating pulses are blocked, and a relatively small lamp operating voltage is developed. At increasing lamp energization levels, the switch 180 is closed for increasing proportions of time, decreasing portions of the lamp operating pulses are blocked and increasing voltages are supplied to the lamp load 24. At high lamp energization levels, the switch 180 is closed for a maximum proportion of time and maximum voltage is applied to the lamp load 24. If desired, at maximum brilliance, the switch 180 can be continuously closed.

In a lamp preheat condition, the lamp load is maintained at a low level, and sufficient power is available for operation of the accessory load 26. The lamp brilliance is controlled essentially independent of variable power requirements of the accessory load 26. At maximum lamp load power levels, the lamp brilliance is not reduced by operation of the accessory load 26.

Figure 11:
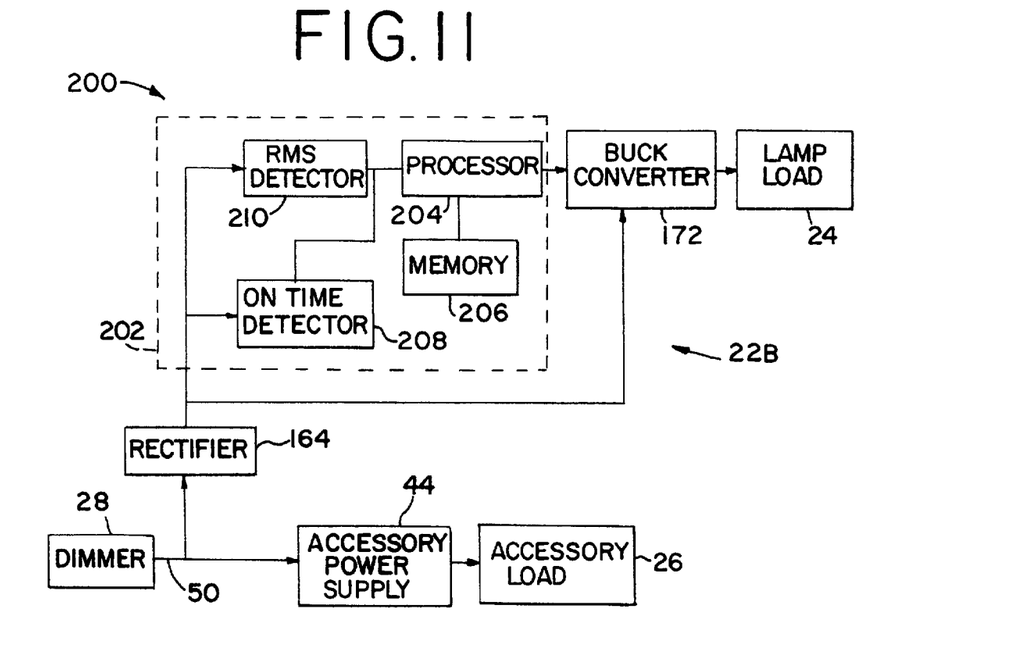
FIG. 11 is a schematic block diagram of another, microprocessor based, embodiment of a luminaire power supply system constructed in accordance with the present invention.

A luminaire power supply system 200, comprising another embodiment of the present invention, is illustrated in FIG. 11, where elements common to the embodiments of FIGS. 1–10 are designated by the same reference characters. The dimmer 28 is connected to a luminaire 22B by the cable 50. The accessory load 26 is supplied with DC operating power by the accessory power supply 44. The power supply system 200 and the accessory power supply 44 may be incorporated into or located in proximity to the luminaire 22A.

The power supply system 200 includes a microprocessor 202 with a central processor unit 204 and a memory 206. Rectifier 164 receives alternating polarity lamp operating pulses from the dimmer 28 and provides uniform polarity pulses to the microprocessor 202 and to the input terminals 182 and 184 of buck converter 172.

An on time detector 208 and an RMS detector 210 are implemented in the microprocessor 202 by conventional programming techniques. The on time detector scans the pulses supplied from the rectifier 164 and determines the duration of each pulse. This provides an indication of the lamp brilliance operating level that is selected by operation of the dimmer 28. The RMS detector receives the pulses supplied from the rectifier 164 and performs a root-means-square calculation to determine the power contained in each lamp operating pulse.

The processor 204 supplies pulses to control the operation of the buck converter 172 in the manner described above. These pulses may be PWM pulses of varying duration, or may be of constant duration and varying frequency or quantity. The actual RMS power detected by the RMS detector 210, for a given pulse on time, is larger when there is little or no accessory load power requirement and smaller when the accessory load power requirement increases. This difference is used to vary the supply of pulses from the processor 204 to the buck converter 172 in order to maintain constant lamp brilliance despite accessory power requirement variations.

Figure 12:
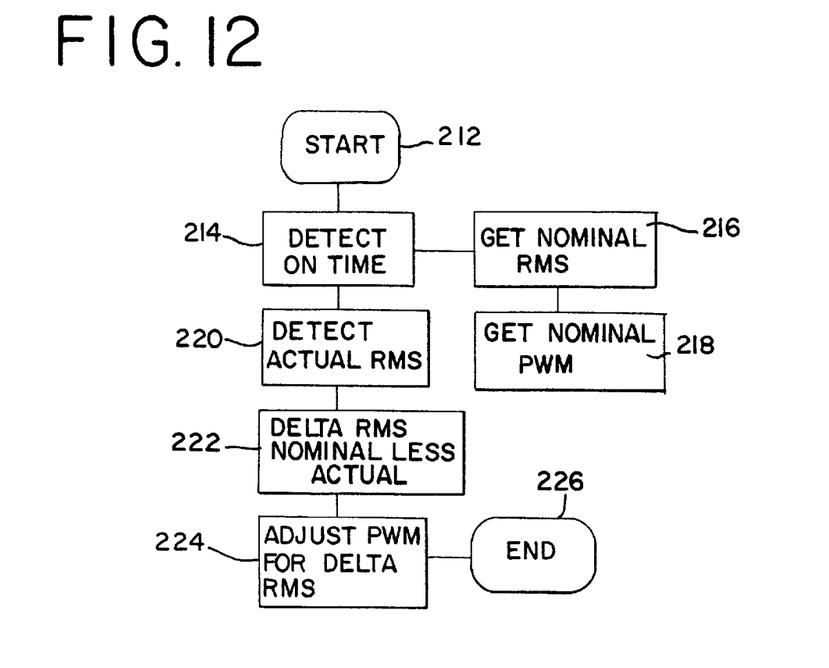
FIG. 12 is a flow chart of a lamp power control routine performed by the luminaire power supply system of FIG. 11.

FIG. 12 is a flow chart illustrating a lamp power control routine performed by the microprocessor 202 of the power supply system 200 and implementing a pulse transfer characteristic for energizing the lamp load 24. The routine is called by processor 204 for each pulse received from the rectifier 164 and starts at start block 212. At block 214, the on time detector 208 detects the on time, or duration, of a lamp operating pulse.

At block 216, the routine uses the detected on time to get a nominal RMS value. The nominal RMS value is the RMS power that is contained in a pulse of the duration detected at block 214 in the absence of any accessory load power consumption. At block 218, the routine also uses the detected on time to get a nominal PWM pulse value. The nominal PWM pulse value is a pulse value that, when applied by processor 204 to the buck converter 172, produces the desired lamp brilliance in the absence of any accessory load power consumption. The nominal PWM and nominal RMS values may be obtained from one or more look up tables in memory 206, or may be calculated using a suitable algorithm contained in memory 206.

The PWM value has a variable parameter, such as pulse duration or frequency or pulse count, that can be varied to alter the pulse transfer characteristic of the system. This is accomplished by varying the proportion of the lamp operating pulses from the dimmer 28 that are blocked in the buck converter 172. The nominal PWM values for various detected on time values are selected to achieve a pulse transfer characteristic similar to the pulse transfer characteristic achieved with the power supply systems 20 and 180. At low lamp energization levels, the proportion of the lamp operating pulses and the power transferred to the lamp load 24 is relatively low so that power for the accessory load 26 is available while little or no power is supplied to the lamp load 24. At increasing lamp energization levels, the proportion of the lamp operating pulses blocked in the buck converter 172 decreases and the level of power transferred to the lamp load increases. At full lamp energization, a minimum or no lamp operating pulse blockage occurs and maximum lamp operating power is transferred so that the lamp load 24 operates at full brilliance.

The operating pulse supplied by dimmer 28 produces a predetermined lamp brilliance in the absence of power consumption by the accessory load 26. If the accessory load is drawing operating power from the lamp operating pulse, the RMS value of the pulse can be decreased. The amount of decrease may depend on the size of the accessory load, the capacity of the dimmer 28 and other factors. If a reduced RMS lamp operating pulse is transferred to the lamp load 24 without correction, the resulting lamp brilliance may be less than the predetermined desired lamp brilliance.

The power supply 200 avoids this problem. At block 220 the RMS detector 208 detects the actual RMS value for the lamp operating pulse. This value may be calculated by detection of the pulse voltage envelope and performance of a root-means-square calculation.

At block 222, the actual RMS value detected at block 220 is compared with the nominal RMS value obtained at block 216. The difference, DELTA RMS, is obtained and passed to block 224 where it is used to adjust the nominal PWM value. If the detected RMS value is equal to the nominal RMS value, then DELTA RMS is zero. In this case, the processor applies to the buck converter 172 the nominal PWM pulse and the predetermined desired lamp brilliance is obtained.

If the detected RMS value differs from the nominal value, DELTA RMS is non-zero. In this case the processor 204 makes an adjustment to the nominal PWM value to correct for the difference. If accessory load power consumption reduces the lamp operating pulse RMS, then the processor 204 modifies the nominal PWM pulse value to decrease the proportion of the lamp operating pulse that is blocked in the buck converter 172 and increase the power transferred to the lamp load 24. Depending on the implementation, this modification may be effected by altering pulse duration or pulse count or frequency or the like. The processor may obtain the correction factor by a calculation or from a look up table stored in memory 206. The routine ends at end block 226.

While the present invention has been described with reference to the details of the embodiments of the invention shown in the drawing, these details are not intended to limit the scope of the invention as claimed in the appended claims.

What is claimed is:

1. A method for extracting power for luminaire accessory operation from lamp operating pulses supplied to a luminaire by a phase angle dimmer, said method comprising:

supplying the output pulses from the phase angle dimmer to the input of an accessory power supply circuit;

applying the output from the accessory power supply circuit to a luminaire accessory having variable power requirements;

delivering the output pulses from the phase angle dimmer to the input of a lamp controller;

furnishing the output from the lamp controller to a lamp of the luminaire; and regulating the transfer of the output pulses from the phase angle dimmer control to the lamp by operation of the lamp controller.

2. The method claimed in claim 1 wherein said regulating step includes altering the pulse transfer characteristic of the lamp controller.

3. The method claimed in claim 1 wherein said regulating step includes altering the pulse transfer characteristic of the lamp controller to maintain consistent apparent lamp brilliance independent of variations in the power requirements of the luminaire accessory.

4. The method claimed in claim 3 wherein said altering step includes transferring regulated portions of the lamp operating pulses to the lamp.

5. The method claimed in claim 4 wherein said altering step includes selecting the regulated portions in order to prevent variations in accessory power requirements from causing visible changes in lamp brilliance.

6. The method claimed in claim 4 wherein said altering step includes using a resistive and capacitive network to integrate the lamp operating pulses and determining a relationship between entire lamp operating pulses and the regulated portions in accordance with the result of the integration.

7. The method claimed in claim 3 wherein said altering step includes blocking portions of the lamp operating pulses.

8. The method claimed in claim 7 wherein said altering step includes blocking an initial part of each lamp operating pulse and then passing the remaining part of each lamp operating pulse.

9. The method claimed in claim 7 wherein said altering step includes pulse width modulating of the lamp operating pulses.

10. The method of claim 3 further comprising operating the lamp in an off condition by continuing said supplying and applying steps to maintain accessory power while, during said regulating step, reducing the transfer of lamp operating pulses to a level insufficient for the lamp to emit a beam of light.

11. The method of claim 3, said operating step comprising operating the lamp in a preheat condition by reducing the transfer of lamp operating pulses to a level sufficient only to preheat the lamp.

12. The method claimed in claim 1 wherein said supplying step and said furnishing step are performed simultaneously by connecting the output of the phase angle dimmer control to both the input of the accessory power supply and to the input of lamp controller.

13. The method claimed in claim 12 wherein the supplying step is performed continuously throughout the lamp operating pulses.

14. The method claimed in claim 1 wherein said applying step includes developing and storing DC power in the accessory power supply circuit during lamp operating pulses, and supplying the stored DC power to the luminaire accessory.

15. A power supply system for a luminaire having a lamp and having a DC powered accessory load with varying DC power requirements, said power supply system comprising:
  a phase control dimmer including a solid state switch providing lamp operating power pulses and having an output;
  a DC accessory power supply circuit connected between said dimmer output and the powered accessory load for extracting DC power from said lamp operating power pulses; and
  a lamp supply circuit branch connected between said dimmer output and the lamp for transferring power from the lamp operating power pulses to the lamp.

16. A power supply system for a luminaire having a lamp and having a powered accessory with varying power requirements, said power supply system comprising:
  a phase control dimmer including a solid state switch providing lamp operating pulses and having an output;
  an accessory power supply connected between said dimmer output and the powered accessory; and
  a lamp supply circuit branch connected between said dimmer output and the lamp for transferring power from the lamp operating pulses to the lamp;
  said lamp supply circuit branch including a lamp controller connected between said dimmer output and the lamp, said lamp controller having a variable pulse transfer characteristic for blocking regulated portions of the lamp operating pulses and applying power to the lamp; and
  said lamp controller including a power level detector in the path of travel of the lamp operating pulses and a regulator controlled by said detector for altering said pulse transfer characteristic to maintain a constant apparent lamp brilliance independent of variations in accessory power requirements.

17. A power supply system as claimed in claim 16, said detector comprising an integrator connected to the input of said lamp supply circuit.

18. A power supply system as claimed in claim 16, said detector including a rectifier connected between said dimmer and said integrator.

19. A power supply system as claimed in claim 16, said regulator comprising a switch for blocking segments of said lamp operating pulses.

20. A power supply system as claimed in claim 19, said regulator comprising a pulse width modulator for controlling said switch.

21. A power supply system as claimed in claim 19, said regulator comprising a multiprocessor for applying control pulses to said switch.

22. A luminaire assembly for use with a phase angle dimmer providing lamp operating power pulses, said luminaire assembly comprising:
  an input connected to receive lamp power operating pulses from the dimmer;
  a lamp load;
  an accessory load having varying DC power requirements;
  an accessory power supply circuit branch connected between said input and said accessory load and including a DC power supply circuit for extracting DC power from said lamp operating power pulses; and
  a lamp controller connected between said input and said lamp load;
  said lamp controller including a solid state switching device in the path of lamp operating power pulses.

* * * * *